United States Patent [19]

Wada et al.

[11] Patent Number: 5,437,822

[45] Date of Patent: Aug. 1, 1995

[54] METHOD FOR PRODUCING A SKIN-FORMED POLYURETHANE FOAM MOLDED PRODUCT

[75] Inventors: Hiroshi Wada; Hisakazu Harada; Shoji Hayashida, all of Kawasaki, Japan

[73] Assignee: Asahi Glass Company Ltd., Tokyo, Japan

[21] Appl. No.: 9,096

[22] Filed: Jan. 26, 1993

[30] Foreign Application Priority Data

Jan. 29, 1992 [JP] Japan .................................. 4-038802

[51] Int. Cl.⁶ .............................................. B29C 44/06
[52] U.S. Cl. ..................... 264/45.5; 264/50; 264/53; 264/54; 264/328.2
[58] Field of Search ............... 264/45.5, 50, 51, 53, 264/54, 328.2

[56] References Cited

U.S. PATENT DOCUMENTS

| | | | |
|---|---|---|---|
| 3,767,743 | 10/1973 | Hostettler et al. | 264/53 |
| 4,440,705 | 4/1984 | Nissen et al. | 264/53 |
| 4,444,703 | 4/1984 | Dominguez et al. | 264/53 |
| 4,444,704 | 4/1984 | Hira et al. | 264/45.5 |
| 4,525,491 | 6/1985 | Narisawa et al. | 264/45.5 |
| 4,608,214 | 8/1986 | Balle et al. | 264/45.5 |
| 4,640,150 | 2/1987 | Kubayashi et al. | 364/45.5 |
| 5,114,980 | 5/1992 | Lii et al. | 264/45.5 |
| 5,141,684 | 8/1992 | Yoshimura et al. | 264/45.5 |
| 5,166,183 | 11/1992 | Franyutti et al. | 264/45.5 |

FOREIGN PATENT DOCUMENTS

| | | |
|---|---|---|
| 0443614 | 8/1991 | European Pat. Off. |
| 2662699 | 12/1991 | France . |
| 62-083135 | 4/1987 | Japan .................. 264/45.5 |

Primary Examiner—Allan R. Kuhns
Attorney, Agent, or Firm—Oblon, Spivak, McClelland, Maier & Neustadt

[57] ABSTRACT

A method for producing a skin-formed polyurethane foam molded product, which comprises reacting a high molecular weight active hydrogen compound containing at least 80% by weight of a polyoxyalkylene polyol having from 2 to 8 hydroxyl groups and a hydroxyl value of from 3 to 60 (mgKOH/g) and consisting essentially of from 20 to 100% by weight of the following component (a) and from 0 to 80% by weight of the following component (b), a chain extender and a polyisocyanate compound in a closed molding tool in the presence of a catalyst and a blowing agent comprising as the main component, at least one member selected from the group consisting of water, a heat decomposable blowing agent capable of generating a gas upon heat decomposition and an inert gas:

(a) a polyoxyalkytene polyol having from 2 to 8 hydroxyl groups and a hydroxyl value X (mgKOH/g) of $3 \leq X \leq 60$, provided that when $3 \leq X \leq 32.5$, the total unsaturated degree Y(meq/g) is $Y \leq 0.04$, and when $32.5 \leq X \leq 60$, X and Y satisfy the relation of the following formula (I):

$$Y \leq 0.9/(X-10) \qquad (1)$$

or a polymer-dispersed polyol having such a polyoxyalkylene polyol as matrix, (b) a polyoxyalkylene polyol other than the above component (a), or a polymer-dispersed polyol having such polyoxyalkylene polyol as matrix.

18 Claims, No Drawings

METHOD FOR PRODUCING A SKIN-FORMED POLYURETHANE FOAM MOLDED PRODUCT

The present invention relates to a method for producing a skin-formed polyurethane foam molded product.

An integral-skin polyurethane foam molded product has a skin layer integrally formed with a foam layer and thus has excellent elasticity and tactile properties. Therefore, it is widely used as interior parts for automobiles, such as steering wheels, crush pads, head rests and arm rests.

The integral-skin polyurethane foam molded product can be prepared by controlling foaming of the polyurethane starting material at the surface portion which is in contact with the inner wall of the molding tool when a polyurethane foam is molded in a closed molding tool, to form an elastomeric skin layer. The integral-skin is usually the one in which the degree of foaming of the skin layer increases (i.e. the density decreases) from the surface of the molded product towards the interior, and in many cases, the boundary between the skin layer and the foam layer is not clear.

The mechanism of formation of the integral-skin is considered to be as follows. Namely, when expansion molding is conducted in a molding tool using a starting material containing as a blowing agent a chlorofluorocarbon-type blowing agent having a relatively high boiling point, at the surface portion in contact with the inner wall of the molding tool, the reaction heat is absorbed by the molding tool, and at the same time, the chlorofluorocarbon-type blowing agent can not be evaporated due to the internal pressure of the molding tool, whereby an integral-skin layer is formed.

Accordingly, for the production of an integral-skin polyurethane foam, selection of the blowing agent is most important, although it is of course necessary to select the polyol and the isocyanate suitable as starting materials. Namely, it is necessary to use a blowing agent which will not be evaporated in the vicinity of the inner wall of the molding tool at a temperature of from 30° to 40° C. a blowing agent having a boiling point lower than the mold temperature. For this reason, trichlorofluoromethane (R-11) has been used which is a chlorofluorocarbon-type blowing agent.

However, the chlorofluorocarbon-type blowing agent such as R-11 is likely to destroy the ozone layer which protects the earth, by the ozone-destruction chain reaction, and it is desired to reduce the quantity of its use.

Water which discharges carbon dioxide upon its reaction with an isocyanate compound, has been used as a substitute for the chlorofluorocarbon-type blowing agent. However, it has drawbacks such that it embrittles the resulting foam, and the amount of the polyisocyanate compound will thereby be increased, thus leading to an economical disadvantage. Further, for the production of an integral-skin polyurethane foam, it has been difficult to form an integral-skin by carbon dioxide which has a low boiling point and which is gaseous at room temperature.

The present inventors have found it possible to produce an integral-skin polyurethane foam molded product without using a chlorofluorocarbon-type blowing agent such as R-11 and by using as a blowing agent water, a heat decomposable blowing agent which generates a gas not-condensable at room temperature, such as carbon dioxide or ammonia, upon heat decomposition, or an inert gas such as air or nitrogen gas.

In the present invention, the integral-skin polyurethane foam molded product is a molded product having a non-foamed skin-layer of the same polyurethane material as the polyurethane foam, integrally formed at the same time as the formation of the polyurethane foam at the time of molding the polyurethane foam. Further, in the present invention, the skin means not only the integral-skin but also a skin wherein the boundary to the foam layer is relatively clear as compared with the integral-skin.

The above-mentioned problems have been solved by the present invention which provides a method for producing a skin-formed polyurethane foam molded product, which comprises reacting a high molecular weight active hydrogen compound containing at least 80% by weight of a polyoxyalkylene polyol having from 2 to 8 hydroxyl groups and a hydroxyl value of from 3 to 60 (mgKOH/g) and consisting essentially of from 20 to 100% by weight of the following component (a) and from 0 to 80% by weight of the following component (b), a chain extender and a polyisocyanate compound in a closed molding tool in the presence of a catalyst and a blowing agent comprising as the main component, at least one member selected from the group consisting of water, a heat decomposable blowing agent capable of generating a gas upon heat decomposition and an inert gas:

(a) a polyoxyalkylene polyol having from 2 to 8 hydroxyl groups and a hydroxyl value $X$ (mgKOH/g) of $3 \leq X \leq 60$, provided that when $3 \leq X \leq 32.5$, the total unsaturated degree $Y$(meq/g) is $Y \leq 0.04$, and when $32.5 \leq X \leq 60$, $X$ and $Y$ satisfy the relation of the following formula (I):

$$Y \leq 0.9/(X-10) \quad (1)$$

or a polymer-dispersed polyol having such a polyoxyalkylene polyol as matrix, (b) a polyoxyalkylene polyol other than the above component (a), or a polymer-dispersed polyol having such a polyoxyalkylene polyol as matrix.

Now, the present invention will be described in detail with reference to the preferred embodiments.

It is known to produce a highly elastic polyurethane foam using a polyoxyalkylene polyol having a low total unsaturated degree such as the above component (a) or to produce a polyurethane elastomer molded product by reaction injection molding, for example, as disclosed in the applicants' Japanese Examined Patent Publications No. 31130/1986 and No. 45730/1986 and Japanese Unexamined Patent Publication No. 14812/1991.

The reason is not clearly understood as to why a skin can be formed even by foaming by means of a non-condensable gas such as carbon dioxide when a polyoxyalkylene polyol having a low total unsaturated degree is used in the present invention. However, it is considered that from such phenomena that as the unsaturated degree of the starting material polyoxyalkylene polyol becomes low, an abrupt temperature rise occurs at a later stage of the polyurethane foam-forming reaction, whereby the temperature difference between the mold surface and the interior of the foam tends to be large, and this tendency becomes remarkable when an organic metal catalyst and an amine catalyst to accelerate resinification are used in combination, resinification proceeds at the surface of the molding tool to form a skin-layer and subsequently foaming and resinification will take place in the interior to form a foam layer. Further, as the unsaturated degree of the polyoxyalkylene polyol becomes low, the amount of an unsaturated monool contained therein tends to be small, i.e. the true number of average functional groups increases as compared with the one having a high unsaturated degree. Thus, crosslinking points of polyurethane increases, and the molecular weight increases, whereby the resin strength will increase so that foaming in the skin-layer once formed will be suppressed.

Generally speaking, as the hydroxyl value of the polyoxyalkylene polyol decreases (i.e. as the molecular weight increases), the unsaturated degree increases, because as the hydroxyl value becomes low, the amount of an oxyalkylene group having at least 3 carbon atoms, particularly an oxypropylene group, as the main oxyalkylene group of the polyoxyalkylene polyol, increases. Accordingly, the amount of reaction of an alkylene oxide having at least 3 carbon atoms during its preparation tends to be large, and consequently, a side reaction of the same alkylene oxide (the reaction for forming unsaturated groups) tends to be substantial.

Component (a) as the essential component in the present invention is a polyoxyalkylene polyol having a hydroxyl value of from 3 to 60 (mgKOH/g) and a low unsaturated degree. The unsaturated degree of this component (a) is required to be not higher than 0.04 (meq/g). Further, with the one having a relatively high hydroxyl value, the unsaturated degree is required to be lower. Namely, the relation between the hydroxyl value X (mgKOH/g) and the unsaturated degree Y (meq/g) is required to be such that when X is not higher than 32.5, Y is not higher than 0.04, and when X is at least 32.5, the relation represented by the above formula (1) (i.e. Y is not higher than 0.9/(X-10)) must be satisfied.

More preferably, component (a) has a hydroxyl value of from 3 to 40 (mgKOH/g) and an unsaturated degree of not higher than 0.03 (meq/g). Still more preferably, component (a) is a polyoxyalkylene polyol having a hydroxyl value of from 3 to 35 (mgKOH/g), and an unsaturated degree of not higher than 0.03 (meq/g). Further, the number of hydroxyl groups (the number of hydroxyl groups per molecule) is from 2 to 8, preferably from 2 to 6. Further, component (a) may, of course, be a mixture of two or more polyoxyalkylene polyols. In such a case, the average unsaturated degree, hydroxyl value and number of hydroxyl groups are within the above identified ranges.

Further, component (a) is a polyoxyalkylene polyol containing mainly an oxyalkylene group having at least 3 carbon atoms. In the case of an oxyalkylene group having two carbon atoms i.e. an oxyethylene group, no side reaction to form an unsaturated group takes place in the reaction for its formation (the addition reaction of ethylene oxide). Accordingly, a polyoxyalkylene polyol having a high proportion of oxyethylene groups, has a low unsaturated degree. However, an integral-skin polyurethane foam molded product obtained from a polyoxyalkylene polyol having a high proportion of oxyethylene groups, as the starting material, does not have practically satisfactory physical properties. Therefore, component (a) is preferably a polyoxyalkylene polyol containing mainly oxyalkylene groups having at least 3 carbon atoms, particularly oxypropylene groups derived from 1,2-propylene oxide.

As component (a), a polyoxyalkylene polyol containing at least 75% by weight of oxyalkylene groups having at least 3 carbon atoms, particularly oxypropylene groups. It may contain oxyethylene groups, but the content of oxyethylene groups is preferably not higher than 20% by weight. Further, the contained oxyethylene groups are preferably located at the terminals of the polyoxyalkylene chains. As the hydroxyl groups bonded to such terminal oxyethylene groups are highly reactive, a polyoxyalkylene polyol containing at least above 3% by weight, particularly at least 5% by weight, of oxyethylene groups at the terminal, is preferred. Preferably, component (a) is a polyoxyalkylene polyol containing mainly oxypropylene groups, i.e. a polyoxypropylene-type polyol, having an oxypropylene group content of at least 75% by weight and an oxyethylene group content of from 3 to 20% by weight.

Further, component (a) may be a polymer-dispersed polyol having the above-mentioned polyoxyalkylene polyol as matrix, or a mixture of such a polymer-dispersed polyol and the polyoxyalkylene polyol. The polymer-dispersed polyol is a dispersion having fine particles of a polymer such as a vinyl polymer dispersed in a polyol. For example, it may be obtained by polymerizing a vinyl monomer such as acrylonitrile or styrene in a polyol.

The polyoxyalkylene polyol used as a starting material for polyurethane, is usually produced by ring-opening addition polymerization of an alkylene oxide such as propylene oxide to an initiator such as a polyhydric alcohol by means of an alkali catalyst such as an alkali metal hydroxide. However, in such a process using an alkali catalyst, a side reaction to form a monool having an unsaturated group, is likely to take place.

It may not be impossible to produce a polyoxyalkylene polyol having a low unsaturated degree and a low hydroxyl value by means of an alkali catalyst, (particularly by employing a mild reaction condition). However, it is preferred to employ a polyoxyalkylene polyol produced by using other catalysts.

As such other catalysts, a metal porphyrin (Japanese Unexamined Patent Publication No. 197631/1986), LiPF$_6$ (Japanese Unexamined Patent Publication No. 197726/1985), a composite metal cyanide complex (Japanese Examined Patent Publication No. 15336/1984 and U.S. Pat. No. 3,939,505) and a complex of a metal with a chelating agent having at least 3 ligands (Japanese Unexamined Patent Publication No. 197726/1985) may, for example, be mentioned. It is particularly preferred to employ a composite metal cyanide complex.

Component (b) is a polyoxyalkylene polyol other than the above-mentioned polyoxyalkylene polyol of component (a), or a polymer-dispersed polyol having such a polyoxyalkylene polyol as matrix. This polyol preferably has from 2 to 8 hydroxyl groups and a hydroxyl value of from 20 to 110. The total unsaturated degree exceeds the above-mentioned range for component (a) when the hydroxyl value is not higher than 60, and it is not particularly limited when the hydroxyl value exceeds 60. Such a polyoxyalkylene polyol can be produced by using a common alkali catalyst. The total unsaturated degree of this polyoxyalkylene polyol of component (b) is usually not higher than 0.1 (meq/g).

The polyoxyalkylene polyol of component (b) is preferably a polyoxyalkylene polyol containing mainly oxyalkylene groups having at least 3 carbon atoms, particularly oxypropylene groups. The content of oxyalkylene groups having at least 3 carbon atoms, is preferably at least 55% by weight. When oxyethylene groups are contained, the content of oxyethylene groups is preferably not higher than 40% by weight, and at least a part thereof is preferably located at terminals of polyoxyalkylene chains. More preferably, the polyoxyalkylene polyol of component (b) is a polyoxypropylene-type polyol having an oxypropylene group content of at least 55% by weight and an oxyethylene group content of from 3 to 40% by weight.

As the polyoxyalkylene polyol of component (b), various polyoxyalkylene polyols other those mentioned above, may be employed. For example, a polyoxyalkylene polyol having a higher hydroxyl value, a polyoxyalkylene polyol having a higher oxyethylene group content, a polyoxyalkylene polyol containing no oxyethylene group and a polyoxyalkylene polyol containing mainly oxyalkylene groups having at least 3 carton atoms other than oxypropylene groups may be used. When these polyoxyalkylene polyols are used, their amount is preferably smaller than the above-mentioned polyoxypropylene-type polyol. It is usually preferred that these polyols are used in combination with the above-mentioned polyoxypropylene-type polyol. The amount of these polyols, if used, should preferably be not higher than 30% by weight relative to the total polyoxyalkylene polyols.

The polyoxyalkylene polyols of component (a) and (b) are usually prepared as follows. Namely, they are prepared by adding at least one type of alkylene oxides to a polyvalent initiator in the presence of a catalyst.

As the alkylene oxides, alkylene oxides having at least 2 carbon atoms, specifically, ethylene oxide, 1,2-propylene oxide, 1,2-butylene oxide, 2,3-butylene oxide and styrene oxide, may, for example, be mentioned. It is preferred to use at least one member selected from the group consisting of 1,2-propylene oxide, 1,2-butylene oxide and 2,3-butylene oxide or to use at least one such member and ethylene oxide in combination.

The polyvalent initiator useful for the preparation of the above polyoxyalkylene polyols includes a polyhydric alcohol, a polyhydric phenol, a polyamine and an alkanol amine. For example, ethylene glycol, diethylene glycol, propylene glycol, dipropylene glycol, neopentyl glycol, 1,4-butanediol, 1,6-hexanediol, glycerol, trimethylolpropane, pentaerythritol, diglycerol, dextrose, sucrose, bisphenol A, ethylene diamine and polyoxyalkylene polyols having lower molecular weights than the desired product obtainable by adding alkylene oxides thereto, may be mentioned. These initiators may be used alone or in combination as a mixture of two or more of them. A particularly preferred polyvalent initiator is a polyhydric alcohol.

The hydroxyl groups in the above polyoxyalkylene polyols preferably contain highly reactive hydroxyl groups i.e. primary hydroxyl groups in a high proportion. Especially in order to conduct a reaction injection molding method in which it is necessary to use a highly reactive starting material, it is usually required that oxyethylene groups are present at terminals of molecular chains of polyoxyalkylene polyols.

Such polyoxyalkylene polyols can be obtained by adding ethylene oxide after adding an alkylene oxide having at least 3 carbon atoms such as 1,2-propylene oxide to a polyvalent initiator. Oxyethylene groups may also be present in the polyoxyalkylene chains. In a case where oxyethylene groups are provided at the terminals of polyoxyalkylene chains for the purpose of improving the reactivity, the content of oxyethylene groups is usually required to be at least 3% by weight, preferably at least 5% by weight.

The higher the content of oxyethylene groups in the polyoxyalkylene polyols, the higher the hydrophilic nature of the resulting integral-skin polyurethane foam. In a case of a molded product used outdoors such as an air spoiler for automobiles, if the hydrophilic nature is too high, the water absorptivity will be high, and the dimensional stability tends to deteriorate. Accordingly, the content of oxyethylene groups in all polyoxyalkylene polyols is preferably not larger than 35% by weight, more preferably not larger than 25% by weight. Further, in such case, it is preferred that majority of oxyethylene groups are present at the terminal portions of molecular chains. In a case where the hydrophilic nature of the integral-skin polyurethane foam is not required to be low, the upper limit of the oxyethylene group content may not be so limited.

As mentioned above, components (a) and (b) in the present invention may be polymer-dispersed polyols having the above-mentioned polyoxyalkylene polyols as matrix. Further, they may be a polymer-dispersed polyol produced by using a mixture of polyoxyalkylene polyols of components (a) and (b) as matrix. A polymer-dispersed polyol is a dispersion having fine polymer particles dispersed in a stabilized condition in such matrix, and the polymer may be an addition-polymerized polymer or a polycondensation polymer.

Fine polymer particles in the polymer-dispersed polyol may be composed of an addition-polymerized polymer such as a homopolymer or copolymer of acrylonitrile, styrene, methacrylate, acrylate or other vinyl monomer, or a polycondensation polymer such as polyester, a polyurea, a polyurethane or a melamine resin. By the presence of such fine polymer particles, the hydroxyl value of the entire polymer-dispersed polyol is usually lower than the hydroxyl value of the matrix polyol. Accordingly, the overall hydroxyl value of the polymer-dispersed polyol having the polyoxyalkylene polyol of component (a) as matrix is preferably at most 60, more preferably from 3 to 35.

The content of fine polymer particles in the polymer-dispersed polyol or in a mixture thereof with the above polyoxyalkylene polyol, is usually at most 60% by weight, preferably at most 40% by weight. The amount of fine polymer particles is not necessarily be large, but a large amount may be used without any particular problem except for economical disadvantage. In many cases, an amount of not higher than 20% by weight is sufficiently effective. The presence of fine polymer particles in the polyoxyalkylene polyols is not essential, but the presence is effective for improvement of the hardness, air permeability and other physical properties of the resulting foam.

The polyoxyalkylene polyol in the present invention consists essentially of the above component (a) or the above components (a) and (b). The combination is such that it comprises from 20 to 100% by weight of component (a) and from 0 to 80% by weight of component (b), based on the total amount of components (a) and (b). More preferably, it comprises from 50 to 100% by weight of component (a) and from 0 to 50% by weight of component (b). More preferably, it comprises from 70 to 100% by weight of component (a) and from 0 to 30% by weight of component (b). The average hydroxyl value of the mixture of the two [hereinafter represented by (a+b)] is required to be from 3 to 60 (mgKOH/g). More preferably, the average hydroxyl value of (a+b) is from 3 to 40 (mgKOH/g). Further, as mentioned above, the average oxyethylene group content of (a+b) is preferably not higher than 35% by weight, particularly not higher than 25% by weight.

The high molecular weight active hydrogen compound as one of the main starting materials for polyurethane is a compound having at least two active hydrogen-containing groups reactive with isocyanate groups, such as hydroxyl groups, primary amino groups, secondary amino groups, etc. In the present invention, this high molecular weight active hydrogen compound is a compound having a molecular weight of at least 600. The high molecular weight active hydrogen compound in the present invention contains at least 80% by weight of (a+b). It may contain other high molecular weight active hydrogen compound, but the amount of such an additional compound is at most 20% by weight.

In the present invention, a high molecular weight polyol or other high molecular weight active hydrogen compound may be incorporated as an optional component in addition to the polyoxyalkylene polyols (a+b) as essential components. However, its use is not essential, but it may be used for the purpose of improving the physical properties of the integral-skin polyurethane foam or for other purposes. For example, to reduce the hydrophilic nature of the integral-skin polyurethane foam, it is preferred to employ a highly hydrophobic high molecular weight polyol such as a hydroxyl group-containing polybutadiene.

As such a high molecular weight polyol, a polyol having an average molecular weight per hydroxyl group of at least 40, particularly at least 800 and an average number of hydroxyl groups per molecule of from 1.6 to 4, is preferred. The average molecular weight per hydroxyl group is preferably not higher than 10000. Such a high molecular weight polyol may, for example, be a hydroxyl group-containing hydrocarbon type polymer such as a hydroxyl group-containing polybutadiene, a polyester polyol or a polyoxytetramethylene polyol.

Further, as other high molecular weight active hydrogen compound, a high molecular weight active hydrogen compound having at least one primary amino group or secondary amino group may be used in combination. As such an active hydrogen compound, an amino group-containing polyoxyalkylene compound having a molecular weight of at least 600 and having at least two functional groups selected from the group consisting of hydroxyl groups, primary amino groups and secondary amino groups, at least one of which is a primary amino group or a secondary amino group, is preferred. Such an amino group-containing polyoxyalkylene compound may, for example, be a compound obtained by converting a part or all of hydroxyl groups of a polyoxyalkylene polyol having a molecular weight of at least 600 to primary amino groups, secondary amino groups or organic groups having such amino groups. Particularly preferred is an amino group-containing polyoxyalkylene compound obtained by converting a part or all of hydroxyl groups of a polyoxypropylene polyol to primary amino groups. Further, a compound obtained by hydrolyzing isocyanate groups of a prepolymer having terminal isocyanate groups obtained by the reaction of a polyoxyalkylene polyol with an excess equivalent amount of a polyisocyanate compound, to convert them to amino groups, may also be employed.

The molecular weight per functional group of such a high molecular weight active hydrogen compound is preferably at least 400, particularly at least 800, and the number of functional groups per molecule is preferably from 2 to 8. The molecular weight per functional group is preferably not higher than 10000.

In the present invention, the chain extender is a compound having a molecular weight of less than 600 having at least two active hydrogen-containing groups reactive with isocyanate groups, such as hydroxyl groups, primary amino groups, secondary amino groups, etc. Particularly preferred is a compound having a molecular weight of not higher than 400 and having at least two functional groups selected from the group consisting of hydroxyl groups, primary amino groups and secondary amino groups. Such chain extenders may be used alone or in combination as a mixture of two or more of them. The chain extender is used usually in an amount of from 1 to 30 parts by weight, preferably from 1 to 15 parts by weight, per 100 parts by weight of the high molecular weight active hydrogen compound.

The polyol-type chain extender having hydroxyl groups, preferably has from 2 to 4 hydroxyl groups. This polyol-type chain extender includes typical chain extenders such as ethylene glycol and 1,4-butanediol. Further, other polyhydric alcohols as well as polyols such as a low molecular weight polyoxyalkylene polyol obtained by adding an alkylene oxide to a polyhydric alcohol or a polyol having tertiary amino groups, may be mentioned.

The polyol-type chain extender includes the following compounds:

ethylene glycol, 1,4-butanediol, neopentyl glycol, 1,6-hexanediol, diethylene glycol, triethylene glycol, dipropylene glycol, triethanolamine, an N-alkyldiethanol and a bisphenol A-alkylene oxide adduct. However, the polyol-type chain extender is not limited to such specific examples. Preferred are ethylene glycol and 1,4-butanediol.

It is also possible to use as a chain extender a compound having one amino group selected from the group consisting of a primary amino group and a secondary amino group and at least one hydroxyl group. As such a chain extender, monoethanolamine, diethanolamine or monoisopropanolamine may, for example, be mentioned. An amine-type chain extender having at least two amino groups selected from the group consisting of primary amino groups and secondary amino groups, may, for example, be an aromatic polyamine, an aliphatic polyamine and an alicyclic polyamine.

As the aromatic polyamine, an aromatic diamine is preferred. As the aromatic diamine, an aromatic diamine having at least one substituent selected from the group consisting group of alkyl groups, cycloalkyl groups, alkoxy group, alkylthio groups and electron attracting groups, on the aromatic ring to which amino groups are bonded, is preferred. Particularly preferred is a diaminobenzene derivative. In the case of the above substituents except for the electron attracting groups, from 2 to 4 of them are preferably bonded to the aromatic ring to which amino groups are bonded, and it is particularly preferred that at least one is bonded to the o-position to the position to which the amino group is bonded, more preferably they are bonded on all positions.

In the case of the electron attracting groups, one or two are preferably bonded on the aromatic ring to which amino groups are bonded. It is of course acceptable that an electron attracting group and other substituent are bonded to one aromatic ring. The carbon number of the alkyl group, the alkoxy group and the alkylthio group is preferably not more than 4, and the cycloalkyl group is preferably a cyclohexyl group. The electron attracting group is preferably a halogen atom, a trihalomethyl group, a nitro group, a cyano group and an alkoxycarbonyl group. Particularly preferred are a chlorine atom, a trifluoromethyl group and a nitro group.

As the aliphatic polyamine, a diaminoalkane or a polyalkylene polyamine having at most 6 carbon atoms, or a polyamine obtained by converting a part or all of the hydroxyl groups of a low molecular weight polyoxyalkylene polyol to amino groups, may, for example, be mentioned. Further, a polyamine having an aromatic ring such as an aromatic compound having at least two aminoalkyl groups, an aromatic compound having a total of at least two aminoalkyl groups or such an aromatic compound having the above-mentioned substituents, may also be used. As the alicyclic polyamine, a cycloalkane having at least two amino groups and/or amino alkyl groups, may be mentioned.

Specific examples of the amine-type chain extender will be given below:

1-methyl-3,5-diethyl-2,4-(or 2,6)-diaminobenzene, monochloro-p-diaminobenzene, 1-methyl-3,5-dimethylthio-2,4-(or 2,6)-diaminobenzene, 1-trifluoromethyl-3,5-diaminobenzene, 1-trifluoromethyl-4-chloro-3,5diaminobenzene, 2,4-toluenediamine, 2,6-toluenediamine, bis(3,5-dimethyl-4-aminophenyl)methane, 4,4-diaminodiphenylmethane, ethylenediamine, 1,4diaminohexane, 1,3-bis(aminomethyl)cyclohexane and isophoronediamine. However, the amine-type chain extender is not limited to such specific examples. Particularly preferred is a diaminobenzene derivative such as a diethyltoluenediamine [one of or a mixture of 1-methyl-3,5-diethyl-2,4-diaminobenzene and 1-methyl-3,5-diethyl-2,6-diaminobenzene], dimethylthiotoluenediamine, monochlorodiaminobenzene or trifluoromethyldiaminobenzene.

Another main starting material for polyurethane is the polyisocyanate compound. As the polyisocyanate compound, an aromatic, alicyclic or aliphatic polyisocyanate having at least two isocyanate groups, a mixture of two or more such polyisocyanates, and a modified polyisocyanate obtained by the modification thereof, may be mentioned. Specifically, polyisocyanates such as tolylene diisocyanate (TDI), diphenylmethane diisocyanate (MDI), polymethylenepolyphenyl diisocyanate (so called crude MDI), xylylene diisocyanate (XDI), isophorone diisocyanate (IPDI) and hexamethylene diisocyanate (HMDI) and prepolymer-type modified products, nurate-modified products, urea-modified products and carbodiimide-modified products thereof, may be mentioned.

A preferred polyisocyanate compound is the MDI-modified product, the crude MDI or a mixture of aromatic polyisocyanates containing one of them as the main component.

The polyisocyanate compound is used usually in an amount of at least 0.8 time in equivalent, relative to the total equivalent of the high molecular weight active hydrogen compound and the chain extender. The upper limit is usually 1.5 times in equivalent, preferably 1.3 times in equivalent, when an isocyanate group-providing catalyst is not used. In the present invention, a preferred amount of the polyisocyanate compound to be used is from 0.8 to 1.3 times in equivalent, relative to the total equivalent of the high molecular weight active hydrogen compound and the chain extender.

The blowing agent to be used in the present invention is a blowing agent containing as the main compound at least one member selected from the group consisting of water, a heat decomposable foaming agent capable of generating a gas upon heat decomposition and an inert gas. Water generates carbon dioxide when reacted with a polyisocyanate compound. The gas generated by the heat decomposition of the heat decomposable blowing agent may, for example, be carbon dioxide, ammonia or nitrogen gas. The inert gas may, for example, be air or nitrogen gas. Such water, a heat decomposable blowing agent and an inert gas may be used alone or in combination. Otherwise, they may be used in combination with other blowing agent. In the case of the combined use with other blowing agent, the amount of the gas (volume) generated by the blowing agent of the present invention is preferably larger than the amount of the gas generated by such other blowing agent.

As the heat decomposable blowing agent in the present invention, a compound capable of discharging carbon dioxide or ammonia upon heat decomposition, is preferred. Such a heat decomposable blowing agent generates a gas when thermally decomposed under a high temperature atmosphere by the reaction heat during the formation of a polyurethane foam. The heat decomposition temperature is preferably from 40° to 100° C., particularly from 50° to 80° C. Specific compounds include, for example, ammonium carbonate, ammonium hydrogencarbonate and ammonium carbamate. They undergo decomposition at about 60° C. to generate carbon dioxide and ammonia.

A blowing agent which generates ammonia as a blowing agent for producing a usual thermoplastic resin foam, is likely to create an environmental problem due to the odor, and it is difficult to use such a blowing agent. However, in the present invention, the generated ammonia will readily be reacted with the polyisocyanate compound and will not be discharged out of the reaction system, and thus, there is no such a problem.

The above-mentioned heat decomposable blowing agent is used as incorporated to the high molecular weight active hydrogen compound or to the component containing it. It is particularly preferred that its fine powder is added and dispersed, or it is preliminarily dissolved in a solvent such as a monoalcohol or a polyhydric alcohol or in water so that it is added in the form of a solution.

The amount of the blowing agent such as water is not particularly limited, but is usually from 0.1 to 10 parts by weight, preferably from 0.1 to 5 parts by weight, per 100 parts by weight of the high molecular weight active hydrogen compound. The amount of the blowing agent including the after-mentioned blowing agent to be used in combination, is properly adjusted depending upon the requirement such as the desired degree of foaming.

In the present invention, as a blowing agent to be used in combination, a chlorofluorocarbon (CFC)-type blowing agent such as R-11 is not desirable. In a case a low boiling point organic compound-type blowing agent is to be used in combination, it is preferred to use a hydrochlorofluorocarbon (HCFC)-type blowing agent, a hydrofluorocarbon (HFC)-type blowing agent, a hydrochlorocarbon (HCC)-type blowing agent or a hydrocarbon-type blowing agent. For example, 1,1-dichloro-1-fluoroethane, 1,1-dichloro-2,2,2trifluoroethane, methylene chloride, butane, pentane, isopentane, hexane, acetone or cellosolve may be mentioned. The amount of such a blowing agent to be used in combination, is not particularly limited. However, when used in combination with water, such a blowing agent is used usually up to 12 parts by weight, particularly up to 8 parts by weight, per 100 parts by weight of the high molecular weight active hydrogen compound.

In the present invention it is not essential to use the above-mentioned blowing agent useful in combination, particularly a low boiling point organic compound-type blowing agent. For example, by using only water as the blowing agent, it is possible to produce a satisfactory integral-skin polyurethane foam.

When the polyol and the polyisocyanate compound are reacted, it is necessary to use a catalyst. As the catalyst to be used in the present invention, it is preferred to use a compound which promotes the reaction of isocyanate groups with active hydrogen containing groups of a chain extender or a polyoxyalkylene polyol, so-called a resinification reaction, rather than the reaction of the polyisocyanate with water, so called a foaming reaction. As the catalyst which promotes the resinification reaction, a metal compound-type catalyst or a certain amine-type catalyst is effective. The amine-type catalyst mainly used for the production of a polyurethane foam is a catalyst which mainly promotes a foaming reaction. However, some of amine-type catalysts have an action to promote the resinification reaction rather than the foaming reaction. As the amine-type catalyst to be used in the present invention, such an amine-type catalyst having an action to promote the resinification reaction, is used. It is of course possible to use a catalyst which promotes the foaming reaction in a relatively small amount together with such an amine-type catalyst or a metal compound-type catalyst.

When the amine-type catalyst having an action to promote the resinification reaction, is used, the amount is usually at most 5 parts by weight, preferably from 0.1 to 3 parts by weight, per 100 parts by weight of the high molecular weight active hydrogen compound. The metal compound-type catalyst is used usually in an amount of at most 2 parts by weight, preferably from 0.001 to 0.5 part by weight. Such two catalysts may be used alone or in combination.

The metal compound-type catalyst useful in the present invention may, for example, be an organic tin compound, an organic bismuth compound, an organic lead compound or an organic zinc compound. Further, the amine-type catalyst having an action to promote the resinification reaction, may, for example, be the following DBU-type compound or imidazole-type compound.

DBU (1,8-diaza-bicyclo[5.4.0]undecene-7) or its carboxylic acid salt or a phenol salt. Imidazole compounds such as 1,2-dimethylimidazole, 2-ethyl-4-methylimidazole, 1-benzyl-2-methylimidazole, 1-cyanoethyl-2-ethyl-4-methylimidazole, 1-aminoethyl-2-methylimidazole, 1-isobutyl-2-methylimidazole, 1-cyanoethylaminoethyl-2-methylimidazole, 2methylimidazole, 2-undecylimidazole, and 2-heptadecylimidazole.

Further, an isocyanate group-providing catalyst for reacting isocyanate groups to one another, such as a metal salt of a carboxylic acid or N,N,N-tris(dimethylaminopropyl)hexahydro-S-triazine, may be used as the case requires. Further, this catalyst may be used in combination with a common tertiary amine catalyst as a catalyst for promoting a foaming reaction, such as tri-ethylenediamine or bi(2-dimethylaminoethyl)ether. In addition to the blowing agent and a catalyst, a foam stabilizer for forming good foam, is used in many cases. As the foam stabilizer, a silicone-type foam stabilizer or a fluorine-containing compound-type foam stabilizer may, for example, be mentioned. Other optional additives include, for example, a filler, a stabilizer, a coloring agent and a flame retardant.

Molding of the integral-skin polyurethane foam is preferably conducted by a method of injecting the reactive mixture into a molding tool by means of a high pressure blowing machine (i.e. a reaction injection molding method). As the high pressure blowing machine, it is preferred to employ a usual type wherein two liquid components are mixed. Usually, one component thereof is a component containing a polyisocyanate compound, and the other component is a component containing a mixture of all starting materials other than the polyisocyanate compound. In some cases, it is possible to form a reactive mixture for injection by a total of three components including a separate component comprising a catalyst or a foam breaker (usually used as dispersed or dissolved in a part of the high molecular weight polyol).

Heretofore, it has been believed essential to use R-11 as a blowing agent for an integral-skin polyurethane foam. However, according to the present invention, an excellent skin can be formed without using a CFC-type blowing agent like R-11. Further, an excellent skin can be formed without necessarily using a blowing agent comprising HCFC or other low boiling point organic compound. Namely, by using a polyoxyalkylene polyol having a low unsaturated degree, it has been made possible to form a skin by using only water or a heat decomposable blowing agent as the blowing agent.

Now, the present invention will be described in further detail with reference to Examples. However, it should be understood that the present invention is by no means restricted to such specific Examples.

STARTING MATERIALS USED IN EXAMPLES AND COMPARATIVE EXAMPLE

I. High Molecular Weight Active Hydrogen Compounds

Polyoxyalkylene polyols A1 to A6, and amino group-containing polyoxyalkylene compound B were used. A1 to A6 are polyoxypropylene oxyethylene polyols having oxyethylene groups only at the oxyalkylene chain terminals. The molecular weights, the number of functional groups, the oxyethylene group contents (EO group contents) (% by weight), the unsaturated degrees (meq/g) and the hydroxyl values (mgKOH/g) thereof are shown in Table 1. B is "Jefermin T5000", trade name, which is believed to be a polyoxypropylene triamine obtained by converting hydroxyl groups of a polyoxypropylene triol having a molecular weight of 5000 to primary amino groups.

II. Chain Extenders

D1 to D3 as identified in Table 2 were used.

III. Catalysts

Amine-type catalysts F1 to F6 and metal compound-type catalysts G1 to G5 as identified in Table 2 were used. Among them, F1 and F6 are usual amine-type catalysts for promoting a foaming reaction.

IV. Foam Stabilizer

A commercially available silicone foam stabilizer ("SF-2962", trade name) was used as foam stabilizer H.

V. Blowing Agents

Blowing agents K1 to K5 as identified in Table 2 were used. VI. Polyisocyanate compound A commercially available modified MDI ("Coronate 1062", trade name) was used as polyisocyanate compound N. The isocyanate group content of this compound was 27.0% by weight.

The above identified starting materials were used in the proportions as identified in Tables 3 to 5 (numerical values represent parts by weight). Among them, the polyisocyanate compound was put into one starting material tank of a reaction injection molding machine (high pressure blowing machine), and its liquid temperature was adjusted to a level of from 20° to 40° C. On the other hand, a mixture comprising the polyol compound, the chain extender, the catalyst, etc. was put into the other starting material tank of the reaction injection molding machine, and its liquid temperature was adjusted to a level of from 20° to 40° C.

The two starting materials were mixed in such a proportion that the isocyanate index became 105, and the mixture was injected. The isocyanate index means 100 times of the equivalent of isocyanate compound to 1 equivalent of all active hydrogen compounds. Injection was conducted under an injection pressure of 150 kg/cm² and at an injection rate of 300 g/s. As the molding tool, a mold having an internal size of 300 mm×500 mm×10 mm (t) was used, and the mold temperature was adjusted to a level of from 40° to 60° C.

The skin-forming states of the resulting integral-skin foam i.e. the density of the molded product (g/cm³) and the thickness of the skin (mm) are shown in Tables 3 to 5. Example 13 represents a Comparative Example.

TABLE 1

| Polyols | Molecular weight | Number of functional groups | Content of EO groups | Unsaturated degree | Hydroxyl value |
| --- | --- | --- | --- | --- | --- |
| A1 | 13000 | 4 | 8 | 0.027 | 17 |
| A2 | 10000 | 3 | 12 | 0.028 | 16.8 |
| A3 | 6000 | 3 | 8 | 0.026 | 28 |
| A4 | 6000 | 3 | 15 | 0.070 | 28 |
| A5 | 4000 | 2 | 20 | 0.070 | 28 |
| A6 | 2500 | 2 | 31 | 0.035 | 45 |

TABLE 2

| | |
| --- | --- |
| Chain extender D1 | Ethylene glycol |
| Chain extender D2 | 1,4-Butanediol |
| Chain extender D3 | m-Xylylenediamine |
| Catalyst F1 | Triethylenediamine-DPG solution ("Dabco-33LV" trade name) |
| Catalyst F2 | DBU |
| Catalyst F3 | DBU phenol salt |
| Catalyst F4 | 1,2-Dimethylimidazole |
| Catalyst F5 | 1-Isobutyl-2-methylimidazole |
| Catalyst F6 | bis(2-Dimethylaminoethyl)ether |
| Catalyst G1 | Dibutyl tin dilaurate |
| Catalyst G2 | Lead octylate (57 wt %)-mineralterpene solution |
| Catalyst G3 | Bismuth-2-ethyl hexanoate |
| Catalyst G4 | Zinc thiodecanoate |
| Catalyst G5 | Dioctyl tin-containing sulfur ester ("UL-29" trade name) |
| Blowing agent K1 | Water |
| Blowing agent K2 | Ammonium carbonate powder |
| Blowing agent K3 | Ammonium hydrogen carbonate powder |
| Blowing agent K4 | Ammonium carbamate powder |
| Blowing agent K5 | Ammonium carbamate (20 wt %)-ethylene glycol solution |

TABLE 3

| Example No. | 1 | 2 | 3 | 4 | 5 |
| --- | --- | --- | --- | --- | --- |
| I | A1:100 | A1:100 | A1:100 | A2:100 | A2:100 |
| | — | — | — | — | — |
| II | D1:5 | D1:5 | D2:7 | D1:5 | D1:5 |
| | — | — | — | — | — |
| III | F2:0.8 | F5:2.0 | F3:1.5 | F2:0.5 | F4:2.0 |
| | F6:0.1 | — | F6:0.2 | — | F6:0.1 |
| | G2:0.01 | — | — | — | G3:0.02 |
| IV | H:0.5 | — | — | — | H:0.5 |
| V | K2:0.5 | K1:0.3 | K3:0.5 | K4:0.2 | K5:0.5 |
| | — | — | — | — | — |
| VI | N:31.3 | N:36.8 | N:30.3 | N:31.3 | N:33.4 |
| Density | 0.60 | 0.65 | 0.68 | 0.63 | 0.66 |
| Thickness | 1.5 | 1.2 | 0.8 | 1.2 | 1.5 |

TABLE 4

| Example No. | 6 | 7 | 8 | 9 | 10 |
| --- | --- | --- | --- | --- | --- |
| I | A2:100 | A3:100 | A3:100 | A3:100 | A4:100 |
| | B:5 | — | — | — | — |
| | — | — | — | — | — |
| II | D2:7 | D1:5 | D1:5 | D2:7 | D1:5 |
| | D3:0.3 | — | — | — | — |
| III | F1:0.3 | F4:1.0 | F3:1.5 | F2:0.5 | F1:1.5 |
| | F4:1.0 | F5:1.0 | F6:0.05 | F3:0.5 | — |
| | F6:0.3 | G1:0.01 | — | G3:0.03 | — |
| IV | — | — | H:0.3 | — | — |
| V | K1:0.5 | K1:0.3 | K2:0.5 | K4:0.1 | K1:0.3 |
| | — | — | K4:0.2 | K5:0.5 | — |
| VI | N:35.5 | N:37.2 | N:34.5 | N:33.5 | N:42.4 |
| Density | 0.58 | 0.61 | 0.61 | 0.70 | 0.68 |
| Thickness | 1.7 | 1.5 | 0.7 | 1.3 | 0.2 |

TABLE 5

| Example No. | 11 | 12 | 13 | 14 |
| --- | --- | --- | --- | --- |
| I | A2:80 | A2:50 | A2:20 | A1:70 |
| | A5:20 | A5:50 | A5:80 | A5:20 |
| | — | — | — | A6:10 |
| II | D1:5 | D1:5 | D1:5 | D1:5 |
| | — | — | — | — |
| III | F1:0.5 | F1:0.5 | F1:0.5 | F5:2.0 |
| | F5:1.0 | F5:1.0 | F5:1.0 | — |
| | G5:0.1 | G5:0.1 | G5:0.1 | — |
| IV | — | — | — | — |
| V | K1:0.5 | K1:0.5 | K1:0.5 | K1:0.6 |
| | — | — | — | — |
| VI | N:38.3 | N:39.2 | N:40.1 | N:41.2 |
| Density | 0.63 | 0.62 | 0.59 | 0.63 |
| Thickness | 1.5 | 1.1 | 0.6 | 1.0 |

As is apparent from the comparison between Examples and Comparative Example, it used to be very difficult to form a skin by foaming without using R-11 as the blowing agent for an integral-skin foam. Whereas, it is shown that by using the system of the present invention, moldability of an integral-skin polyurethane foam molded product without using R-11 can be substantially improved.

What is claimed is:

1. A method for producing an integral skin-formed polyurethane foam molded product, which comprises reacting a high molecular weight active hydrogen compound containing at least 80% by weight of a polyoxyalkylene polyol having from 2 to 8 hydroxyl groups and a hydroxyl value of from 3 to 60 (mgKOH/g) and consisting essentially of from 20 to 100% by weight of the following component (a) and from 0 to 80% by weight of the following component (b), a chain extender and a polyisocyanate compound in a closed molding tool in the presence of a catalyst and a blowing agent consisting essentially of water, a heat decomposable blowing agent capable of generating a gas upon heat decomposition, an inert gas, or mixtures thereof:

(a) a polyoxyalkylene polyol having from 2 to 8 hydroxyl groups and a hydroxyl value X (mgKOH/g) of $3 \leq X \leq 60$, provided that when $3 \leq X \leq 32.5$, the total unsaturated degree Y(meq/g) is $Y \leq 0.04$, and when $32.5 \leq X \leq 60$, X and Y satisfy the relation of the following formula (I):

$$Y \leq 0.9/X-10) \tag{1}$$

or a polymer-dispersed polyol having such a polyoxyalkylene polyol as matrix, (b) a polyoxyalkylene polyol other than the above component (a), or a polymer-dispersed polyol having such a polyoxyalkylene polyol as matrix, wherein the skin layer obtained has a thickness of at least 0.5 mm and, wherein the integral-skin polyurethane foam molded product is produced by reaction injection molding using two components, a first component comprising the high molecular weight active hydrogen compound and the chain extender, and a second component containing the polyisocyanate compound.

2. The method according to claim 1, wherein the polyoxyalkylene polyol consists essentially of from 50 to 100% by weight of component (a) and from 0 to 50% by weight of component (b).

3. The method according to claim 1, wherein the polyoxyalkylene polyol consists essentially of from 70 to 100% by weight of component (a) and from 0 to 30% by weight of component (b).

4. The method according to claim 1, wherein the polyoxyalkylene polyol of component (a) is a polyoxyalkylene polyol having from 2 to 8 hydroxyl groups, a hydroxyl value of from 3 to 40 (mgKOH/g) and a total unsaturated degree of not more than 0.03 (meq/g).

5. The method according to claim 4, wherein the polyoxyalkylene polyol of component (a) is a polyoxypropylene-type polyol having an oxypropylene group content of at least 75% by weight and an oxyethylene group content of from 0 to 20% by weight.

6. The method according to claim 1, wherein the polyoxyalkylene polyol of component (b) is a polyoxyalkylene polyol having from 2 to 8 hydroxyl groups and a hydroxyl value of from 20 to 110 (mgKOH/g).

7. The method according to claim 6, wherein the polyoxyalkylene polyol of component (b) is a polyoxypropylene-type polyol having an oxypropylene group content of at least 55% by weight and an oxyethylene group content of from 0 to 40% by weight.

8. The method according to claim 1, wherein the high molecular weight active hydrogen compound contains up to 20% by weight of an amino group-containing polyoxyalkylene compound having a molecular weight of at least 600 and having at least two functional groups selected from the group consisting of hydroxyl groups, primary amino groups and secondary amino groups, provided that at least one of the functional groups is a primary amino group or a secondary amino group.

9. The method according to claim 1, wherein the chain extender is a compound having a molecular weight of less than 600 and having at least two functional groups selected from the group consisting of hydroxyl groups, primary amino groups and secondary amino groups.

10. The method according to claim 1, wherein a chlorofluorocarbon (CFC)-type blowing agent is not used as the blowing agent.

11. The method according to claim 1, wherein the blowing agent consists essentially of water.

12. The method according to claim 1, wherein the heat decomposable blowing agent is a heat decomposable blowing agent capable of generating at least one member selected from the group consisting of carbon dioxide and ammonia, upon heat decomposition.

13. The method according to claim 12, wherein the heat decomposable blowing agent is at least one compound selected from the group consisting of ammonium carbonate, ammonium hydrogencarbonate and ammonium carbamate.

14. The method according to claim 1, wherein the blowing agent is used in an amount of from 0.1 to 3 parts by weight per 100 parts by weight of the high molecular weight active hydrogen compound.

15. The method according to claim 1, wherein the amount of the blowing agent is adjusted to prepare an integral-skin polyurethane foam molded product having an average density of from 0.1 to 0.9 g/cm$^3$.

16. The method according to claim 1, wherein the chain extender is used in an amount of from 1 to 15 parts by weight per 100 parts by weight of the high molecular weight active hydrogen compound.

17. The method according to claim 1, wherein the polyisocyanate compound is used in an amount of from 0.8 to 1.5 times in equivalent to the total amount of the high molecular weight active hydrogen compound and the chain extender.

18. The method according to claim 1, wherein the integral-skin polyurethane foam molded product is a steering wheel for automobiles.

* * * * *